US006400868B1

(12) United States Patent
Riant et al.

(10) Patent No.: US 6,400,868 B1
(45) Date of Patent: Jun. 4, 2002

(54) PHOTOSENSITIVE OPTICAL FIBER FOR A BRAGG GRATING FILTER, A METHOD OF FABRICATING SAID FIBER, AND A CHROMATIC DISPERSION AND CHROMATIC DISPERSION SLOPE COMPENSATOR INCLUDING A FIBER OF THIS KIND

(75) Inventors: Isabelle Riant; Pierre Sansonetti, both of Palaiseau (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/490,672

(22) Filed: Jan. 24, 2000

(30) Foreign Application Priority Data

Jan. 25, 1999 (FR) ............................................. 99 00759

(51) Int. Cl.⁷ .............................. G02B 6/34; G02B 6/18
(52) U.S. Cl. ......................................... 385/37; 385/124
(58) Field of Search ............................ 385/37, 124, 31

(56) References Cited

U.S. PATENT DOCUMENTS

| 5,195,161 A | * 3/1993 | Adar et al. ................. 385/129 |
| 5,818,987 A | * 10/1998 | Bakhti et al. ................. 385/28 |
| 5,881,188 A | * 3/1999 | Starodubov ................... 385/37 |
| 6,009,222 A | * 12/1999 | Dong et al. ................. 385/127 |
| 6,055,081 A | * 4/2000 | Koyano et al. ............. 359/161 |

FOREIGN PATENT DOCUMENTS

| EP | 0 668 514 A2 | 8/1995 |
| EP | 0 784 217 A1 | 7/1997 |
| JP | 08 286 050 | 1/1996 |
| JP | 08 286 055 | 1/1996 |
| WO | WO 94/00784 | 1/1994 |

OTHER PUBLICATIONS

Hill et al., "Fiber Bragg Grating Technology Fundamentals and Overview," Aug. 1997, Journal of Lightwave Technology vol. 15 No. 8, pp. 1263–1276.*

* cited by examiner

Primary Examiner—Akm E. Ullah
Assistant Examiner—Jerry T Rahll
(74) Attorney, Agent, or Firm—Sughrue Mion, PLLC

(57) ABSTRACT

The invention proposes a photosensitive optical fiber for inscribing a Bragg grating by UV illumination, in which the photosensitivity is very high either to reduce the exposure time or to increase the contrast of the optically induced refraction index variations, whilst retaining a reasonable exposure time. Thanks to this high contrast, the fiber of the invention, imprinted with a linear chirp, in addition to correcting chromatic dispersion, is also effective in correcting the chromatic dispersion slope of a fiber of ordinary contrast, imprinted with a quadratic chirp. In a preferred embodiment, the fiber of the invention is photosensitive in the cladding. In a particularly advantageous embodiment, a non-photosensitive dopant is added to the core of said fiber to reduce the refractive index in the core, reducing the birefringence of the fiber.

11 Claims, 3 Drawing Sheets

PHOTOSENSITIVE OPTICAL FIBER FOR A BRAGG GRATING FILTER, A METHOD OF FABRICATING SAID FIBER, AND A CHROMATIC DISPERSION AND CHROMATIC DISPERSION SLOPE COMPENSATOR INCLUDING A FIBER OF THIS KIND

BACKGROUND OF THE INVENTION

The field of the invention is that of fiber optic telecommunications. The invention relates to a photosensitive fiber for fabricating a Bragg grating filter and to a method of fabricating a fiber of this kind. The filter obtained using this fiber is particularly suitable for compensating chromatic dispersion and chromatic dispersion slope effects in a fiber optic link without introducing any penalty in terms of polarization mode dispersion.

The effects of chromatic dispersion are cumulative over the length of the link and are therefore greater on long links. Also, chromatic dispersion causes temporal widening of the pulses transmitted over the link. The risk of errors at the receiver due to this widening is lower if the pulses are sufficiently spaced in time. However, in very high bit rate systems the temporal widening can be comparable with the spacing between pulses, leading to the possibility of an error rate unacceptable to the link operator.

In a practical link, as deployed at present, another cause of pulse widening is polarization mode dispersion (PMD).

It is therefore important to minimize PMD and to correct chromatic dispersion periodically in long-haul high bit rate links.

The prior art, in particular document D1=Laming, R. I. et al., "Dispersion compensating fiber Bragg gratings", Proc. WFOPC—Workshop on Fiber Optics Passive Components, University of Pavia, Sep. 18–19, 1998, pp. 108–116, includes a fiber Bragg grating (FBG) which is "chirped" to compensate chromatic dispersion. The following documents may also be referred to on the subject of dispersion compensation:

D2=Loh, W. H. et al.,: "Dispersion compensated 10 Gbit/s transmission over 700 km of standard single mode fiber with 10 cm chirped fiber grating and duobinary transmitter", Proc. OFC '96, paper PD 30, San Jose Calif., USA, 1996.

D3=Cole, M. C. et al., "Broadband dispersion compensating chirped fiber Bragg gratings in 10 Gbit/s NRZ 100 km non-dispersion shifted fiber link operating at 1.5 $\mu$m", Electron. Lett. V.33 (1) pp. 70–71, 1977.

Document D1 teaches the use of a quadratically chirped FBG to compensate dispersion slope (see p.114). To create the Bragg grating with the required characteristics within the fiber, the core is first charged with a dopant which renders the fiber photosensitive. Refractive index variations are then induced along the fiber by irradiating the fiber with ultraviolet (UV) light through a phase mask, using a standard method. The fabrication parameters of interest are therefore:

The composition and concentration of the photosensitive dopants;

The wavelength, luminous intensity (power) and exposure time of the ultraviolet light; and The form (contrast, spacing, etc.) of the phase mask.

According to document D1, the phase mask is uniform and the wavelength reflected by the Bragg grating is modified according to the length of the fiber in the region to be exposed. Linear variation of the wavelength along the fiber can be used to correct second order chromatic dispersion (conventionally referred to as chromatic dispersion). Quadratic variation of the phase (inversely proportional to the wavelength) along the length of the fiber can be used to correct third order chromatic dispersion (dispersion slope).

However, the method taught by document D1 is difficult to implement and would seem to be ill-suited to an industrial scale process. Furthermore, a fine structure of group time variations with wavelength has been observed. Uncontrolled effects such as fluctuations of the fiber and mechanical vibrations cause quasi-interferometric noise. Despite low polarization dependent differential losses (PDL), differential group delay dispersion (PMD—polarization mode dispersion) has been observed, attributed by the authors to birefringence of the host fiber. This birefringence is attributable either to deformations of the fiber (stresses, ellipticity, etc.) or to the UV radiation.

Document D4=Williams, J. A. R. et al., "Fiber Bragg Grating fabrication for dispersion slope compensation", IEEE Photonics Tech. Lett. 8 (9) pp. 1187–1189, September 1996, teaches another method of providing a dispersion slope corrector. According to document D4, a photosensitive fiber is irradiated in two steps: first a constant pitch linear grating is inscribed optically in the core of the fiber using a uniform phase mask; a second irradiation is then performed at constant power, without a mask and at a speed that is varied along the fiber. The object of varying the speed is to vary the exposure time and therefore the luminous energy delivered, in order to modify the optically induced index variation. The result is that the mean index varies along the fiber and the Bragg wavelength therefore varies in the same manner along the fiber. This method has yielded a chromatic dispersion slope corrector device with a narrow bandwidth, in the order of 0.7 nm. However, technical process control problems arise in implementing devices having a greater usable bandwidth: aligning and focusing the laser onto the core of the fiber, controlling the acceleration and rate of displacement of the fiber, etc.

OBJECTS AND SUMMARY OF THE INVENTION

An object of the invention is to alleviate the known problems of the prior art in providing a Bragg grating dispersion slope corrector filter and the performance problems of filters obtained in this way.

To this end, the invention proposes a photosensitive optical fiber for forming an optically induced Bragg grating filter, said optical fiber having a core and a cladding, said core of said fiber having a refractive index $n_c$ and said cladding of said fiber having a refractive index $n_g$, said core being doped with a photosensitive first element, and said first element being Germanium, wherein the concentration $C_{Ge}$ of Ge in the core is at least equal to 10%: $C_{Ge} \geq 10\%$, and wherein said core is further doped with a photosensitive or non-photosensitive second element to reduce the refractive index $n_c$ of the core to reduce the refractive index difference to a value less than: $\Delta n = n_c - n_g \leq 6 \times 10^{-3}$. This low refractive index step is to minimize the unwanted effect of PMD.

The invention further proposes a Bragg filter formed from a photosensitive optical fiber of the above kind in which said Bragg grating is formed in the core of an optical fiber as a quasi-periodic succession of variations of the optical refractive index $\Delta n_1$ along the length ($\underline{z}$) of said fiber with a period close to $\Delta L$; said Bragg grating also having a variation $\delta L(z)$ of said period $\Delta L$ along the length ($\underline{z}$) of said fiber; wherein said variation $\delta L(z)$ of said period $\Delta L$ is a linear or quadratic variation along the length ($\underline{z}$) of said fiber. Linear variation can correct at least second order chromatic dispersion; quadratic variation can correct third order chromatic dispersion (dispersion slope).

According to a feature of the invention the optical refractive index variations $\Delta n_1$ are high: $\Delta n_1 \geq 3 \times 10^{-4}$. According to another feature of the invention said variation $\delta L(z)$ of said period $\Delta L$ is a linear variation along the length ($z$) of said fiber.

Linear variation of the period, with high index variations, corrects third order chromatic dispersion (dispersion slope).

In a variant of the invention, the cladding of said fiber is also doped with said first photosensitive element Ge. According to another feature of the invention a third photosensitive or non-photosensitive element is added to the cladding to reduce the index difference $\Delta n = n_c - n_g \leq 6 \times 10^{-3}$, again with the aim of obtaining low PMD. In various embodiments of the invention:

said second doping element is fluorine;
said second doping element is boron;
said third doping element is fluorine;
said third doping element is boron.

BRIEF DESCRIPTION OF THE DRAWINGS

Other features and advantages of the invention emerge from the following detailed description and the accompanying drawings, in which.

MORE DETAILED DESCRIPTION

In all the figures, the same reference symbols designate the same components, but for clarity not all the figures are to the same scale.

Figure 1:
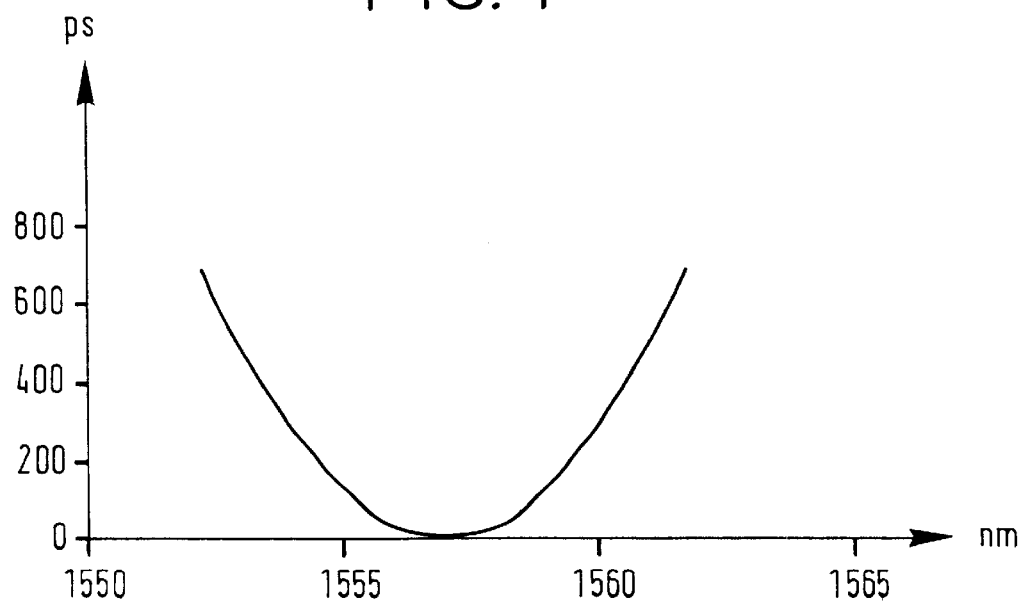
FIG. 1 is a diagram showing an example of a dispersion slope to be corrected.

FIG. 1 shows an example of chromatic dispersion to be corrected, as might be observed in a repeater in a very long haul optical link. A link of this kind is typically made up of a plurality of sections of optical fiber which connect a plurality of stations or repeaters in which the signals to be propagated are periodically amplified and reshaped before they are transmitted in another section. As is clear from the documents cited above, the use of Bragg grating filters to correct chromatic dispersion and even chromatic dispersion slope is well-known. If the correction is successful, the variation of the group time with wavelength shown in FIG. 1 is canceled out, i.e. the group time is the same for all wavelengths in the wanted transmission band.

Figure 2:
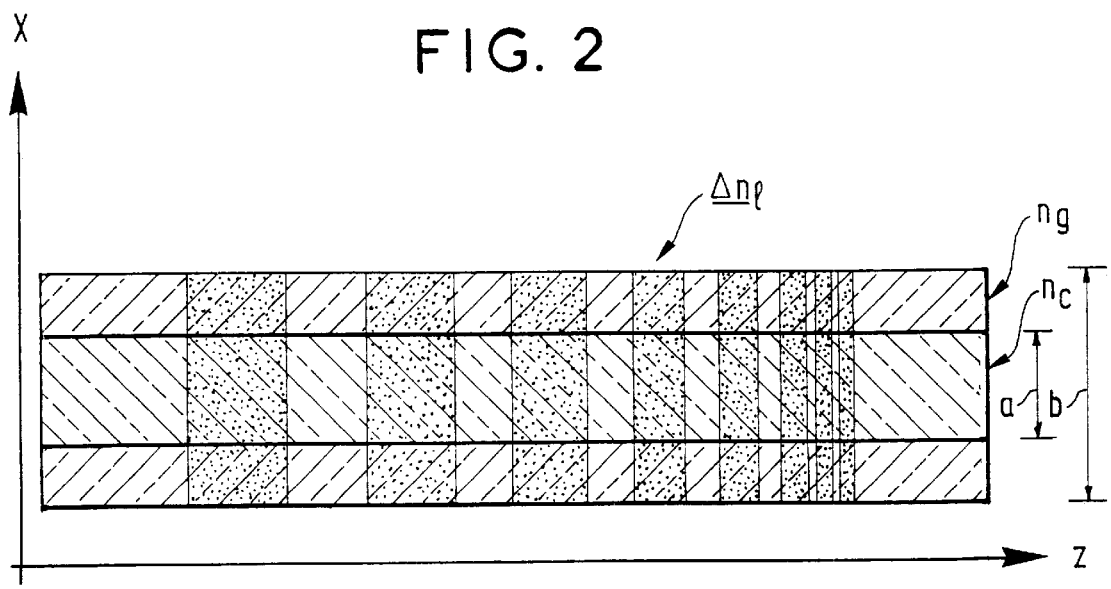
FIG. 2 is a diagram showing an example of an optical fiber in accordance with a feature of the invention having an optically inscribed Bragg grating with a linear variation of the pitch of the grating (linear "chirp"); also, the grating is in the cladding of the fiber.

FIG. 2 is a diagram showing an example of an optical fiber in accordance with a feature of the invention having an optically inscribed Bragg grating with linear variation of the pitch of the grating (linear "chirp"). A Bragg grating filter with linear chirp is conventionally used to correct second order chromatic dispersion. The guiding optical fiber has a core of diameter a having a refractive index $n_c$ and a cladding having a refractive index $n_g$. For guidance to be achieved, a typical value of the optical index difference is $\Delta n = n_{c-ng} \approx 5 \times 10^{-3}$. Higher index differences can be obtained, but it is known that the fiber form birefringence of the fiber varies in proportion to the square of this difference, $(\Delta n)^2$ and the stress birefringence proportionately, $(\Delta n)$. Also, it has been shown that the PMD of the dispersion compensator is proportional to the birefringence of the fiber. It is therefore desirable to introduce only a small difference ($\Delta n$) to prevent PMD degrading the signal.

FIG. 2 also shows the induced photo index variations $\Delta n_1$. Their mean spacing $\Delta L$ determines the Bragg wavelength of the filter. FIG. 2 shows diagrammatically and in an exaggerated form a variation $\delta L(z)$ of the pitch of the grating along the length $z$ of the fiber. In one particularly advantageous embodiment of the invention, the variation $\delta L(z)$ is a linear function of position $z$ along the fiber and the optically induced refractive index variation is relatively high: $\Delta n_1 \geq 3 \times 10^{-4}$. In this case, the Bragg filter obtained is able to correct not only second order chromatic dispersion but also, and unexpectedly, third order chromatic dispersion.

High index variation can be obtained either by increasing the exposure to ultraviolet light, for example by increasing the exposure time, or by increasing the photosensitivity of the core by adding a greater concentration of photosensitive dopant. Increasing the exposure time leads to problems-connected with the accuracy of the instrumentation delivering the light beam and especially its stability in time. According to a preferred feature of the invention, high index variation is obtained by doping with a high concentration of Germanium in the core ($C_{Ge} \geq 10\%$).

However, introducing a strong concentration of Ge into the core changes the refractive index of the core and can therefore increase birefringence and therefore polarization mode dispersion. To avoid these unwanted penalties of increasing the concentration of Ge in the core and increasing the index difference An between the core and the cladding of the fiber, in a preferred variant of the invention said core is further doped with a photosensitive or non-photosensitive second element to reduce the refractive index $n_c$ of the core in order to reduce the index difference to a normal value, for example: $\Delta n = n_c - n_g \leq 6 \times 10^{-3}$.

In one particular embodiment of the invention, as shown in FIG. 2, the fiber cladding is also photosensitive and the Bragg grating extends into the cladding. This avoids coupling to the cladding modes, which would lead to filter insertion losses. As previously, another photosensitive or non-photosensitive dopant can also be added to obtain a guiding fiber of low birefringence: $\Delta n = n_c - n_g \leq 6 \times 10^{-3}$.

Two non-photosensitive elements are proposed for such doping: fluorine (F) and boron (B). Other dopants could be used.

Figure 3:
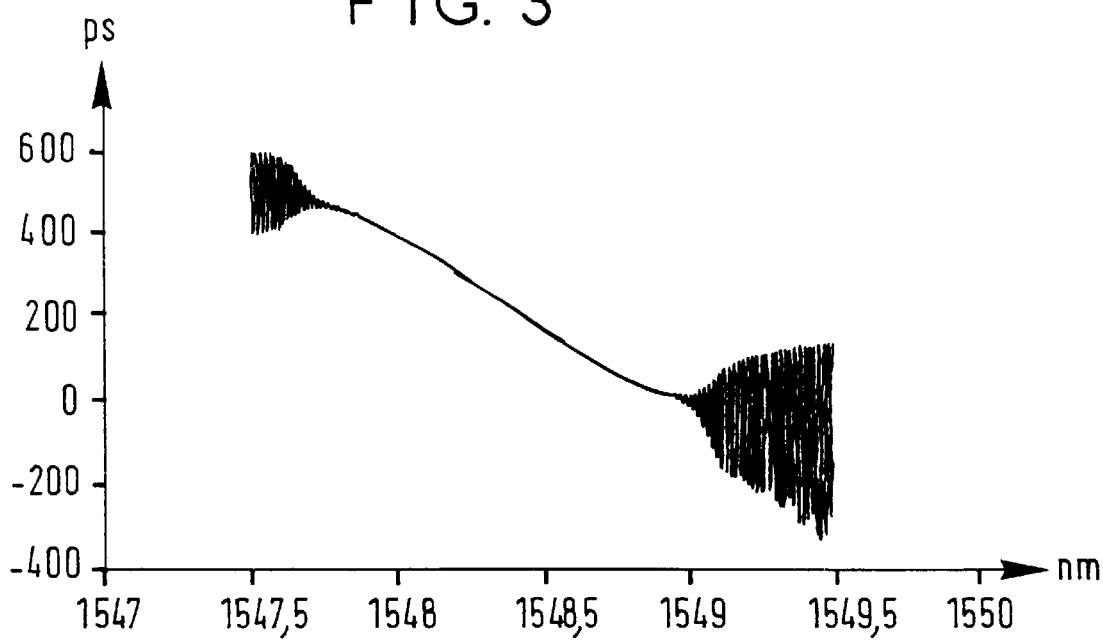
FIG. 3 is a diagram showing an example of a linear group time response conventionally obtained with a filter as shown in FIG. 2 when the optically induced index variations $\Delta n_1$ are normal, in the order of $\Delta n_1 \approx 10^{-4}$.

FIG. 3 is a diagram showing an example of a linear response conventionally obtained with a filter as shown in FIG. 2 when the optically induced index variations $\Delta n_1$ are normal, in the order of $\Delta n_1 \approx 10^{-4}$. Note that the prior art filter, with normal index variations, would have a substantially linear group time response as a function of wavelength.

Figure 4:
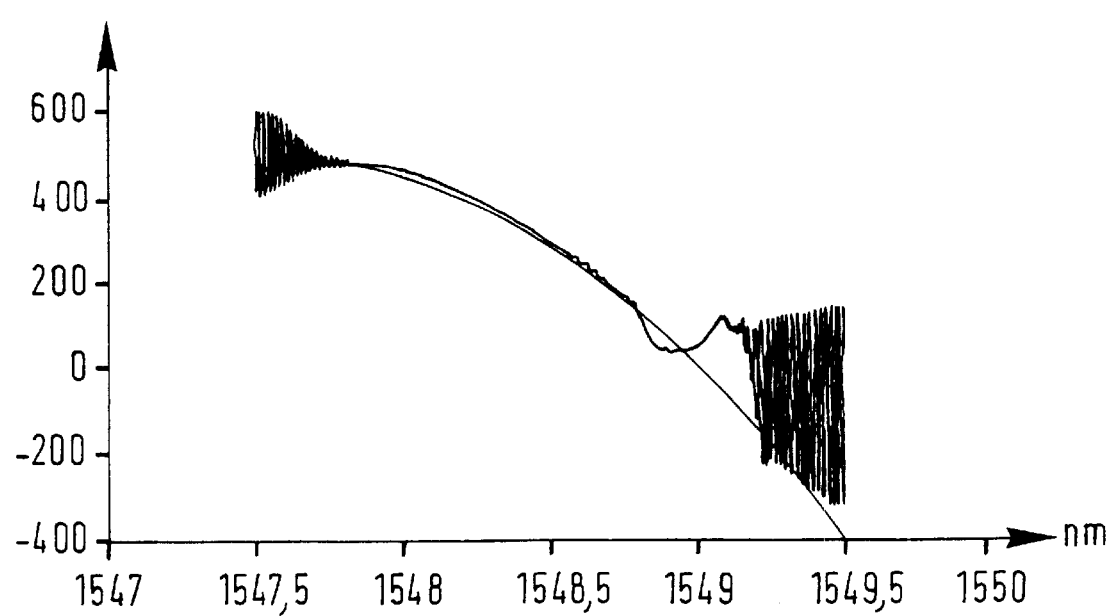
FIG. 4 is a diagram showing an example of a quadratic group time response obtained with a filter as shown in FIG. 2, but with high optically induced index variations $\Delta n_1 \geq 3 \times 10^{-4}$ (here $6 \times 10^{-4}$)

On the other hand, FIG. 4 is a diagram showing an example of a quadratic response obtained with a filter as shown in FIG. 2 but with high optically induced index variations: $\Delta n_1 \geq 3 \times 10^{-4}$. It can be seen that the quadratic effect which characterizes the required dispersion slope correction can be obtained only with the linear chirp from FIG. 2, on condition that the contrast of the optically induced index variations is relatively high: $\Delta n_1 \geq 3 \times 10^{-4}$.

Figure 5:
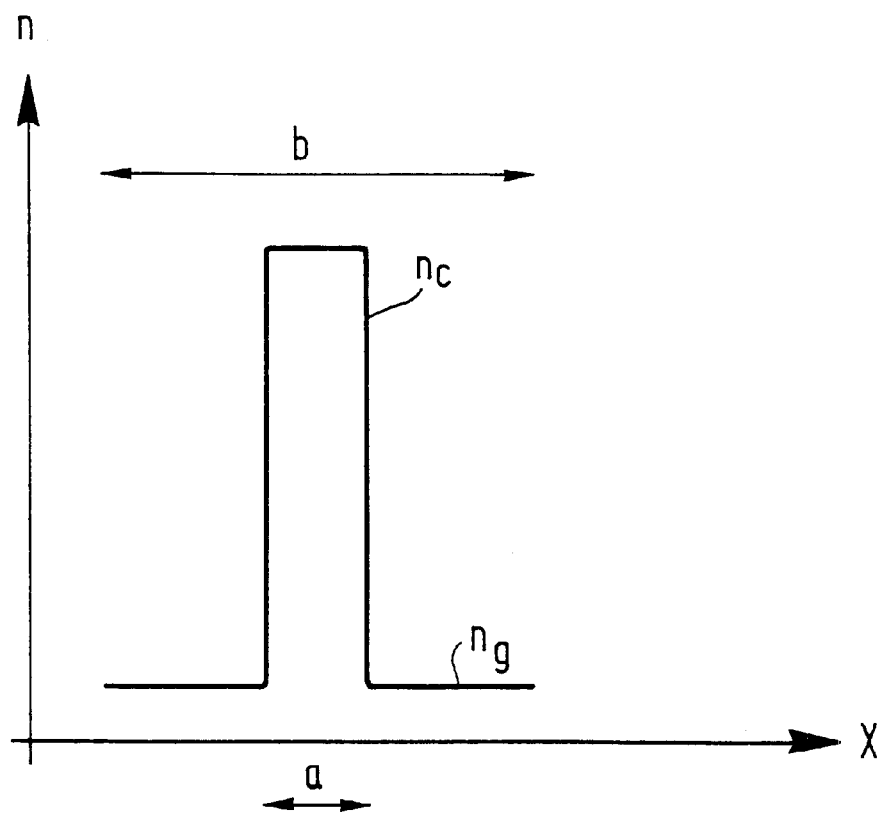
FIG. 5 is a diagram showing an example of a refractive index profile obtained with strong Ge doping ($C_{Ge} \geq 10\%$) of the core of the fiber in accordance with the invention without a co-dopant.
Figure 6:
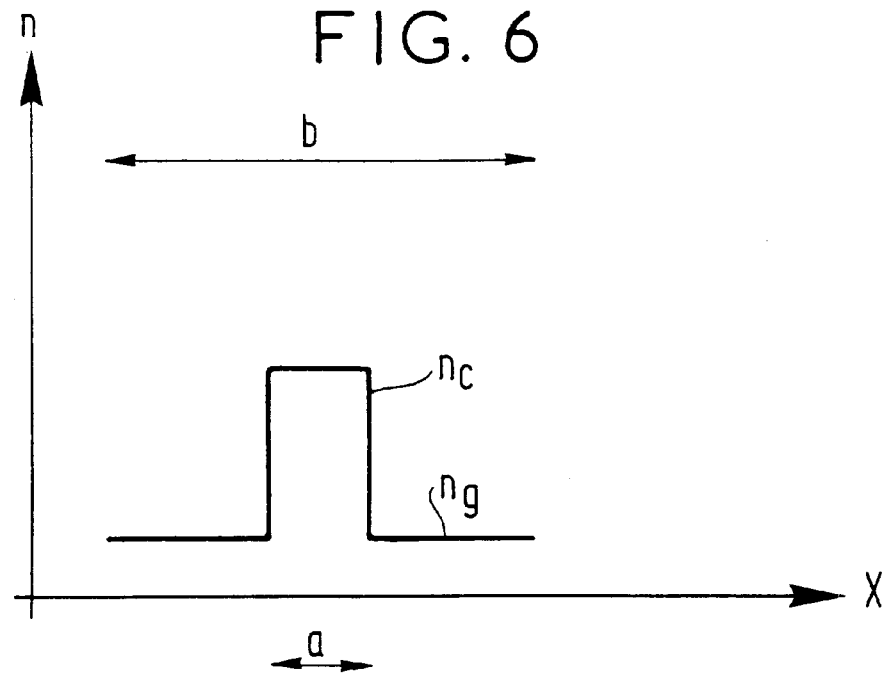
FIG. 6 is a diagram showing an example of refractive index profile obtained with strong Ge doping ($C_{Ge} \geq 10\%$) of the core of the fiber in accordance with the invention with a co-dopant.

As explained above with reference to FIG. 2, in one variant of the invention the optically induced index variation is increased, whilst retaining a reasonable writing time, by a higher concentration of photosensitive dopant Ge in the core. This increases the refractive index of the core, as shown in FIG. 5. This can lead to a penalty in terms of PMD, and to avoid this one variant of the invention proposes to add a photosensitive or non-photosensitive co-dopant to the core to reduce the index difference between the core and the cladding: $\Delta n = n_c - n_g \leq 6 \times 10^{-3}$. FIG. 6 shows a refractive index profile of this kind.

For example, for a value of $\Delta n$ of $30 \times 10^{-3}$, as shown in FIG. 5, and with a grating length of 50 mm, a chromatic dispersion of 450 ps/nm is obtained, but with 3 ps of PMD. On the other hand, when a co-dopant is added to reduce the refractive index difference to a normal value: $\Delta n = 5 \times 10^{-3}$, as shown in FIG. 6, the same grating length (50 mm) produces the same chromatic dispersion (450 ps/nm) but with much less PMD, in the order of 0.25 ps.

The invention has been described with the aid of a few non-limiting embodiments. The skilled person knows how to apply the principles of the invention to many embodiments and equivalents without departing from the scope of the invention as defined by the following claims.

What is claimed is:

1. A Bragg filter formed from a photosensitive optical fiber, said Bragg filter being formed in the core of said photosensitive optical fiber by irradiation with light to create a quasi-periodic succession of optically induced variations of the optical refractive index $\Delta n_1$ along the length $\underline{z}$ of said fiber with a period close to $\Delta L$; said Bragg grating also having a variation $\delta L(z)$ of said period $\Delta L$ along the length $\underline{z}$ of said fiber; said variation $\delta L(z)$ of said period $\Delta L$ being a linear or quadratic variation along the length $\underline{z}$ of said fiber; said optical fiber having a core and a cladding, said core of said optical fiber having a refractive index $n_c$ and said cladding of said optical fiber having a refractive index $n_g$, said core being doped with a photosensitive first element, said first element being Germanium, wherein the concentration $C_{Ge}$ of Ge in the core is at least equal to 10%: $C_{Ge} \geq 10\%$, and wherein said core is further doped with a photosensitive or non-photosensitive second element to reduce the refractive index $n_c$ of the core to reduce the refractive index difference to a value less than:

$$\Delta n = n_c - n_g \leq 6 \times 10^{-3}.$$

2. A Bragg filter according to claim 1, wherein said second element does not increase the photosensitivity of said core of said fiber.

3. A Bragg filter according to claim 1, wherein the optical refractive index variations $\Delta n_1$ are high:

$$\Delta n_1 \geq 3 \times 10^{-4}.$$

4. A Bragg filter according to claim 3, wherein said variation $\delta L(z)$ of said period $\Delta L$ is a linear variation along the length $\underline{z}$ of said fiber.

5. A chromatic dispersion slope corrector device including the Bragg grating filter claimed in claim 1 formed in the core of an optical fiber as a succession of high optical refractive index variations $\Delta n_1$: $\Delta n_1 \geq 3 \times 10^{-4}$, said variations being quasi-periodic with a period close to $\Delta L$ along the length $\underline{z}$ of said fiber, said Bragg grating also having a variation $\delta L(z)$ of said period $\Delta L$ along the length $\underline{z}$ of said fiber; wherein said variation $\delta L(z)$ of said period $\Delta L$ is a linear variation along the length $\underline{z}$ of said fiber.

6. A Bragg filter according to claim 1, wherein the cladding of said fiber is also doped with said first photosensitive element Ge.

7. A Bragg filter according to claim 6, wherein a third photosensitive or non-photosensitive element is added to the cladding to reduce the index difference $$\Delta n = n_c - n_g \leq 6 \times 10^{-3}.$$

8. An optical fiber according to claim 1, wherein said second dopant is fluorine.

9. An optical fiber according to claim 1, wherein said second dopant is boron.

10. A chromatic dispersion corrector device including a Bragg grating filter according to claim 1.

11. A chromatic dispersion slope corrector device including a Bragg grating filter according to claim 1.

* * * * *